United States Patent
Howard (10) Patent No.: US 7,251,785 B1
(45) Date of Patent: Jul. 31, 2007

(54) METHOD AND SYSTEM OF PROVIDING ACCESS PRIVILEGES TO RECORDS OF MEMBERS OF A COMMUNITY

(75) Inventor: Kathryn A. Howard, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 08/920,433

(22) Filed: Aug. 29, 1997

(51) Int. Cl.
*G06F 7/00* (2006.01)

(52) U.S. Cl. .......................... 715/743; 707/9; 715/741; 715/742; 709/223; 709/225; 705/1

(58) Field of Classification Search .................. 705/1; 707/9; 709/223, 225; 715/743, 742, 741
See application file for complete search history.

(56) References Cited

U.S. PATENT DOCUMENTS

| | | | | |
|---|---|---|---|---|
| 5,276,901 A | * | 1/1994 | Howell et al. .................. | 707/9 |
| 5,335,346 A | * | 8/1994 | Fabbio .......................... | 395/600 |
| 5,469,576 A | * | 11/1995 | Dauerer et al. ................. | 707/9 |
| 5,678,041 A | * | 10/1997 | Baker et al. .................... | 707/9 |
| 5,694,590 A | * | 12/1997 | Thuraisingham et al. ....... | 707/9 |
| 5,720,033 A | * | 2/1998 | Deo ............................. | 395/186 |
| 5,729,734 A | * | 3/1998 | Parker et al. ................... | 707/9 |
| 5,826,268 A | * | 10/1998 | Schaefer et al. ............... | 707/9 |
| 5,870,733 A | * | 2/1999 | Bass et al. ...................... | 705/2 |

OTHER PUBLICATIONS

Meyer, Gary. "Visual guidance system steers Windows–based HRIS." HRMagazine, vol. 39, No. 2, pp. 37–40, Feb. 1994.*

O'Connell, Sandra E. "Security for HR records." HRMagazine, vol. 39, No. 9, pp. 37–41, Sep. 1994.*

"Tackling security issues: heterogeneous networks make database security a challenge." Midrange Systems, vol. 7, No. 20, p. 34–, Oct. 1994.*

"Hired hand for HR Pros." Windows Magazine, vol. 6, No. 11, p. 188, Oct. 1995.*

"Employease gives customers even greater control." Business Wire, Sep. 1998.*

"Employease—Technical White Paper." from Web site: www.eease.com (retrieved Mar. 12, 1999), no date.*

Workshop Summary from the Proceedings of the First ACM Workshop on Role–Based Access Control, Dec. 1995.*

* cited by examiner

Primary Examiner—William Thomson
(74) Attorney, Agent, or Firm—Baker Botts L.L.P.

(57) ABSTRACT

A method and system of providing access privileges to records of members of a community may comprise storing an assignment of a member of a community to a first position in the community to generate a first relationship. Access privileges to records of the member may be automatically provided to a manager of the first position based on the first relationship. An additional assignment of the member to a second position in the community may be stored to generate a second relationship. During the pendency of the additional assignment, a manager of the second position may be automatically provided with disparate access privileges to records of the member based on the second relationship.

20 Claims, 6 Drawing Sheets

METHOD AND SYSTEM OF PROVIDING ACCESS PRIVILEGES TO RECORDS OF MEMBERS OF A COMMUNITY

RELATED APPLICATIONS

This application is related to copending U.S. patent application Ser. No. 08/921,130, entitled "METHOD AND SYSTEM OF ROUTING REQUESTS FOR AUTHORIZED APPROVAL," and U.S. patent application Ser. No. 08/921,128, entitled "METHOD AND SYSTEM OF DETERMINING ACCESS TO RECORDS OF MEMBERS OF A COMMUNITY,".

TECHNICAL FIELD OF THE INVENTION

The present invention relates generally to the field of managing human resources in a computer system, and more particularly a method and system of providing access privileges to records of members of a community.

BACKGROUND OF THE INVENTION

Modern businesses often employ integrated computer systems to gather and record information from various departments and operations. Such integrated systems allow information to be efficiently shared between departments. Information collected may include accounting records, payroll records, personnel records, manufacturing records, and the like.

In a decentralized business environment, integrated computer systems may provide front line managers with information pertaining to employees reporting to the managers. Such information may include personnel records and other sensitive information of the employees. A manager may use this information to perform human resources and other decentralized tasks for employees reporting to the manager.

Decentralized business environments may be used in connection with matrix organizations. Matrix organizations are typical of businesses in the service industry where people are a primary resource of the company and need to be leveraged between accounts to maximize their expertise. In a matrix organization, a manager has responsibilities and needs access to records of employees who administratively belong to an organization managed by the manager and employees who are temporarily performing work for the organization but administratively belong to another organization.

SUMMARY OF THE INVENTION

Accordingly, a need has arisen in the art for manager access to records of employees that report to the manager. The present invention provides a method and system of providing access privileges to records of members of a community that substantially reduce or eliminate problems associated with prior systems and methods.

In accordance with the present invention, a method of providing access privileges to records of members of a community may comprise storing an assignment of a member of a community to a first position in the community to generate a first relationship. A manager of the first position may be automatically provided with access privileges to records of the member based on the first relationship. An additional assignment of the member to a second position in the community may be stored to generate a second relationship. During the pendency of the additional assignment, a manager of the second position may be automatically provided with disparate access privileges to records of the member based on the second relationship.

More specifically, in accordance with one embodiment of the present invention, the community may comprise a business and the member an employee of the business. In this embodiment, the additional assignment may comprise a temporary work assignment within the business. The manager of the first position may have access privileges to administrative records of the member denied to the manager of the second position.

In accordance with another aspect of the present invention, the method of structuring relationships of members of the community may comprise assigning a first member of the community to a first manager position in the community. A second member of the community may be assigned to a second manager position in the community. The first manager position may be assigned to the second manager position in a substitute, surrogate or other relationship.

More specifically, in the substitute relationship, the first manager position may be provided with full access privileges of the second manager position to records of members of the community reporting to the second manager position. In the surrogate relationship, the first manager position may be provided with limited access privileges of the second manager position to records of the members of the community reporting to the second manager position. The limited access privilege provided to the first manager position may exclude access privileges of the second manager position to administrative records of the members of a community reporting to the second manager.

Technical advantages of the present invention include varying manager access privileges to records of members of the community reporting to the managers depending on the responsibilities of the manager to the member. In particular, an administrative manager may have greater access privileges to records of a member than a work assignment manager. Accordingly, managers are provided with only needed access privileges to records of a member reporting to the manager.

Another advantage of the present invention includes initiating work flow for approval of assignments. In particular, an assignment of a member to an organization outside the domain of a manager initiating the assignment may be routed to an appropriate manager for approval. The assignment may be activated upon such approval. Accordingly, assignments between organizations may be reviewed and approved by affected managers prior to being activated.

Still another technical advantage of the present invention includes providing assignments between positions. In particular, a manager position may be assigned to another manager position in a substitute, surrogate or other relationship. In the substitute relationship, the first manager position may be provided with full access privileges of the second manager position to records of members of the community reporting to the second manager position. In the surrogate relationship, the first manager position may be provided with limited access privileges of the second manager position to records of members of the community reporting to the second manager position. Accordingly, substitute, surrogate and other relationships need not be updated when managers holding manager positions in such relationships are replaced.

Other technical advantages of the present invention will be readily apparent to one skilled in the art from the following figures, descriptions, and claims.

BRIEF DESCRIPTION OF THE DRAWINGS

For a more complete understanding of the present invention, and its advantages thereof, reference is now made to the following description taken in conjunction with the accompanying drawings, wherein like reference numerals represent like parts, in which.

DETAILED DESCRIPTION OF THE INVENTION

The preferred embodiments of the present invention and its advantages are best understood by referring now to FIGS. 1–7 of the drawings, in which like numerals refer to like parts. FIGS. 1–7 illustrate a method and system of structuring relationships of members of a community and of determining access to records of the members of the community. As described in more detail below, the method and system may provide for different types of relationships between managers and other members of the community. The different relationships may provide the managers with disparate access privileges to records of members reporting to the managers. A manager's access to records of a member may be authorized by determining the type of relationship between the manager and the member and if the requested access is authorized for that relationship. Accordingly, managers are provided only with needed access privileges to records of members reporting to the managers.

Figure 1:
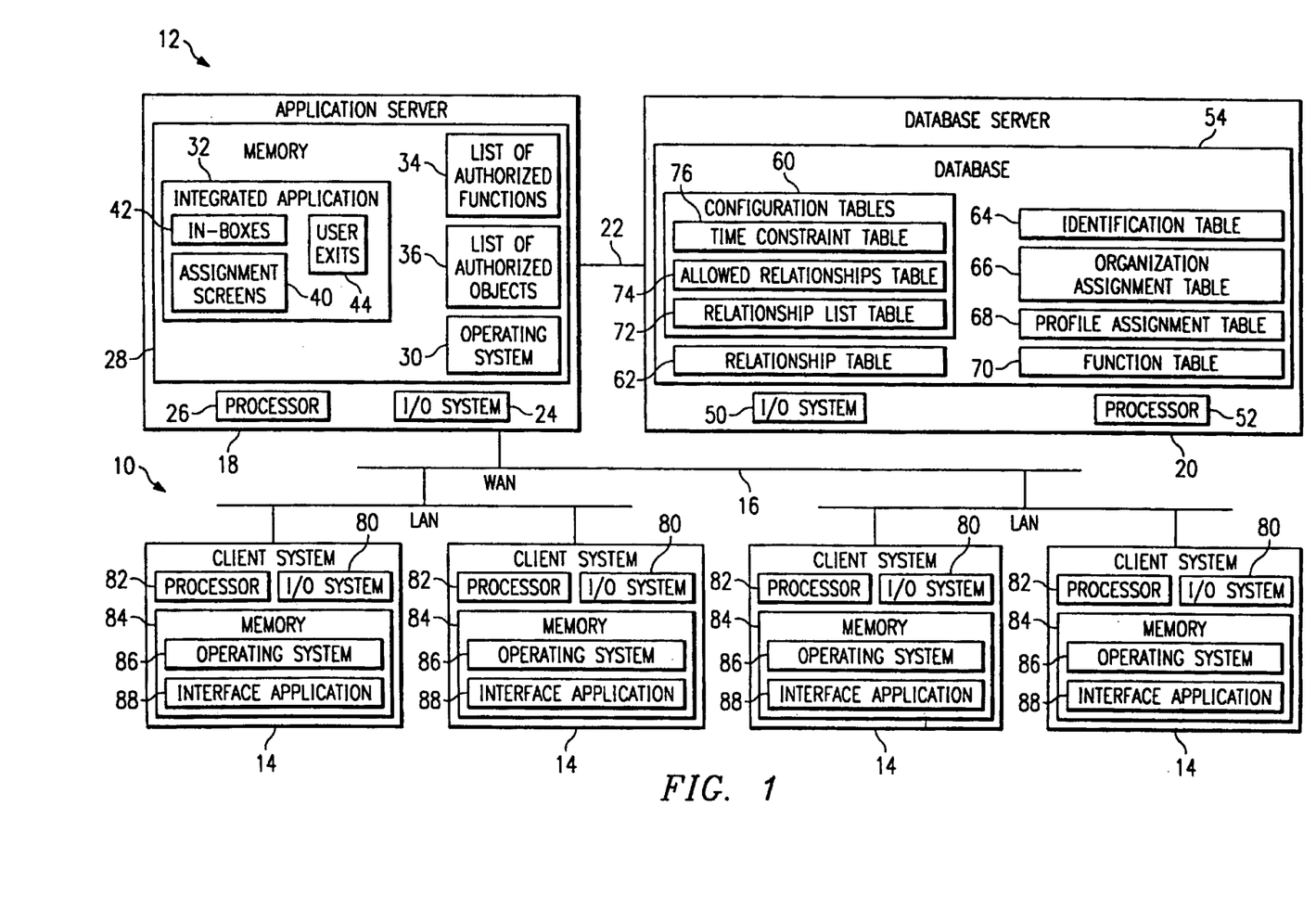
FIG. 1 is a block diagram illustrating a distributed system for structuring relationships and authorizing access to records of members of a community in accordance with one embodiment of the present invention.

FIG. 1 is a block diagram illustrating a distributed system 10 for structuring relationships of members of a community and authorizing access to records of the members of the community. The community may be a business, organization, association or any other type of grouping having a plurality of members. The members may be persons, animals, objects or any other type of item of a community. The present invention will be generally described in connection with a business community. In this embodiment, the members may comprise employees of the business. It will be understood that the described method and system may be used in connection with other types of communities having other types of members and still remain within the scope of the present invention. It will be further understood that the system 10 may be otherwise configured within the scope of the present invention. For example, the system may operate as a stand alone system.

The distributed system 10 may comprise a server system 12 connected to a plurality of client systems 14 via a network 16. The server system 12 may be one or more computers such as a personal computer, file server, workstation, mini computer, mainframe or any other computer capable of communicating and interconnecting with at least one other computer.

The server system 12 may comprise an application server 18 connected to a database server 20 via a network 22. The application server 18 may comprise an input/output system 24, a processor 26 and a memory 28. The input/output system 24 may connect the networks 16 and 22 and other input and output devices to the application server 18. The networks 16 and 22 may be directly connected to the application server 18 or may be connected through a data transmission device such as a modem or the like. Input devices may include a pointing device such as a mouse, a track pad, a keyboard and the like. Output devices may include a monitor, a printer and the like.

The application server 18 includes computer software that may be loaded into the memory 28 and executed by the processor 26. Computer software may generally be identified by applications, modules and similar systems in memory 28. It will be understood that the computer software may be otherwise combined and/or divided for processing within the scope of the present invention. Accordingly, labels of the applications, modules and other software systems are for illustrative purposes and may be varied and still remain within the scope of the present invention.

The computer software may be loaded into memory 28 from disk storage (not shown). Disk storage may include a variety of types of storage media. For example, disk storage may include floppy disk drives, hard disk drives, CD/ROM drives or magnetic tape drives.

In one embodiment, memory 28 may include an operating system 30, an integrated application 32, a list of authorized functions 34 and a list of authorized objects 36. The operating system 30 may comprise a proprietary SAP (Systems, Applications and Products in Data Processing) operating system manufactured by SAP AG of Germany. It will be understood that other types of operating systems may be used within the scope of the present invention.

The integrated application 32 may structure the relationship of members of a community. In one embodiment, the integrated application 32 may receive and process assignments of the members within the community. In this embodiment, the assignments may be from a member of the community to an identifiable position within the community or between positions within the community. It will be understood that the integrated application 32 may otherwise structure relationships and still remain within the scope of the present invention.

The integrated application 32 may also authorize access to records of the members of the community. In one embodiment, the integrated application 32 may authorize a manager to access records of a member reporting to the manager by determining the type of relationship between the manager and the member and determining if the requested access is authorized for that relationship. It will be understood that the integrated application 32 may otherwise authorize access to records of members of the community and still remain within the scope of the present invention.

In one embodiment, the integrated application 32 may comprise SAP R/3 software manufactured by SAP AG of Germany. In this embodiment, the integrated application 32 may comprise SAP human resource, work flow and other modules. It will be understood that other types of integrated applications 32 capable of structuring relationships of members of a community and authorizing access to records of the members of the community may be used within the scope of the present invention.

The integrated application 32 may include assignment screens 40 and inboxes 42 as are currently known in the art. The integrated application 32 may also include user exits 44. The assignment screens 40 may display organizations, positions assigned to organizations, and members assigned to positions in the community. The assignment screens 40 may also receive and process assignments, reassignments, and/or additional assignments of the members to positions in the community. In one embodiment, the assignments and reassignments may be administrative assignments of a member to a position in the community while the additional assignments may be temporary work assignments of a member to a second position in the community. It will be understood that the assignments may be varied and still remain within the scope of the present invention.

The assignment screens 40 may display the status of assignments. In one embodiment, an assignment may have a planned, submitted, approved, rejected and active status. In this embodiment, the assignment may be planned when initially entered by a manager or other member of the community. The assignment may be submitted when the planned assignment is submitted to the integrated application 32. As described in more detail below, the integrated application 32 may determine if approval of the assignment is required. If approval is required, the integrated application 32 may initiate a work flow request to obtain required approvals for the assignment. The assignment may become approved upon successful completion of the work flow process. The assignment may become rejected upon a rejection during the work flow process. After approval, or if no approval is required, the integrated application 32 may activate the assignment. It will be understood that assignments may have other status indicators or be otherwise activated and still remain within the scope of the present invention.

In one embodiment, an assignment may be finalized upon activation of the assignment. In this embodiment, access privileges based on the assignment may be granted upon such activation. It will be understood that access privileges may be otherwise granted and still remain within the scope of the present invention. For example, access privileges may be granted for planned or other assignments.

The inboxes 42 may receive and process assignments between positions in the community. In one embodiment, the positions may be manager positions and the assignment may be a substitute, surrogate or other relationship. In this embodiment, no approval may be required to assign a manager position to another manager position in a substitute or surrogate relationship. However, it will be understood that a position-to-position assignment of a manager or other member of the community may require approval as previously described in connection with the assignment of a member to a position. It will be further understood that the position-to-position assignments may be otherwise entered and still remain within the scope of the present invention. For example, position-to-position assignments may be entered using the assignment screens 40.

The user exits 44 may be used to limit access privileges of a manager or other member of the community to records of a member of the community reporting to the manager. In one embodiment, managers may have default full access privileges to records of related members which may be limited by the user exits 44. Full access privileges may comprise access to all administrative records of a member while limited access privileges is a subset of full access privileges.

In a particular embodiment, as described in more detail below, administrative and substitute managers may have full access privileges to records of reporting members while work assignments and surrogate managers have limited access privileges to the records of reporting members. In this embodiment, user exits 44 may comprise a work assignment user exit and a surrogate manager user exit to limit access privileges for those relationships. It will be understood that the integrated application 32 may comprise user exits for other types of relationships and still remain within the scope of the present invention. It will be further understood that access to records of members may be otherwise granted and/or limited within the scope of the present invention. It will be further understood that full access privileges may comprise other types of privileges and that privileges may be otherwise limited and still remain within the scope of the present invention.

The list of authorized functions 34 may comprise functions that may be performed by the user in the system 10. Such functions may include reading, writing to or otherwise manipulating records of the user. It will be understood that the system 10 may comprise other functions and still remain within the scope of the present invention.

In one embodiment, the integrated application 32 may generate the list of authorized transactions 34 upon login to the system 10 by a user. As described in more detail below, the integrated application 32 may generate the list of authorized functions 34 by interrogating tables of the database server 20. It will be understood that the integrated application 32 may otherwise generate the list of authorized functions 34 and still remain within the scope of the present invention. It will be further understood that the integrated application 32 may otherwise determine authorized functions of a user and still remain within the scope of the present invention.

The list of authorized objects 36 may be a relationship record and comprise members of the community related to the user such that the user is authorized to access records of those members. In accordance with the one aspect of the present invention, the list of authorized objects 36 may include the relationship between the user and the included members. Accordingly, access privileges of the user to records of a member may be based on the relationship between the user and the member. It will be understood that the list of authorized objects 36 may comprise other information and still remain within the scope of the present invention.

In one embodiment, the integrated application 32 may generate the list of authorized objects 36 in response to the user's selection of a function from the list of authorized functions 34. As described in more detail below, the integrated application 32 may generate the list of authorized objects 36 by interrogating tables of the database server 20. It will be understood that the integrated application 32 may otherwise generate the list of authorized objects 36 and still remain within the scope of the present invention. It will be further understood that the integrated application 32 may otherwise determine related members of the community whose records the user is authorized to access.

The database server 20 may comprise an input/output system 50, a processor 52 and a database 54. The input/output system 50 may connect the network 22 and other input and output devices to the database server 20. Input devices may include a pointing device such as a mouse, a track pad, a keyboard and the like. Output devices may include a monitor, a printer and the like.

The database 54 includes computer records that may be generally identified by tables. It will be understood that the computer records may be otherwise combined and/or divided within the scope of the present invention. Accordingly, labels of the tables are for illustrative purposes and may be varied while still remaining within the scope of the present invention.

The database 54 may comprise configuration tables 60, a relationship table 62, an identification table 64, an organization assignment table 66, a profile assignment table 68 and a function table 70. The configuration tables 60 may delineate the relationships allowed between members and/or positions in the community. It will be understood that the allowed relationships may be otherwise delineated and still remain within the scope of the present invention.

In one embodiment, the configuration tables 60 may comprise a relationship list table 72, an allowed relationships table 74 and a time constraint table 76. In this embodiment, the relationship list table 72 may comprise the types of relationships allowed within the community. In a particular embodiment, the allowed relationships may comprise administrative, work assignment, substitute and surrogate relationships. It will be understood that the relationship list table 72 may include other relationships and still remain within the scope of the present invention.

The allowed relationships table 74 may delineate which types of objects the relationships may be between. For the embodiment described above, the administrative and work relationships may be between a member and a position. The substitute and surrogate relationships may be between positions. Specifically, a member may hold a position in an administrative assignment relationship and another position in a work assignment relationship. A manager may manage a first management position and substitute or surrogate manage an additional management position. It will be understood that the relationships may be between other objects and still remain within the scope of the present invention. It will be further understood that the system 10 may comprise other relationships and still remain within the scope of the present invention.

The time constraint table 76 may delineate the number of positions to which a manager or other member of the community may be assigned. In one embodiment, each manager and/or member of the community may be assigned to one or many positions. It will be understood that the number of allowed positions may be otherwise delineated within the scope of the present invention. It will be further understood that the configuration tables 60 may comprise other or disparate tables within the scope of the present invention.

The relationship table 62 may list the relationships between objects in the community or otherwise record assignments between objects in the community. The objects may comprise members and/or positions of the community. In one embodiment, the relationship table 62 may comprise a listing for each relationship between objects in the community. In this embodiment, each listing may include an object, a related object and the relationship between the object and related object. It will be understood that the relationship table 62 may be otherwise structured and still remain within the scope of the present invention.

In one embodiment, assignments may be activated when the resulting relationship is listed in the relationship table 62. Accordingly, active assignments may be determined from the relationship table 62 and access privileges granted based on the relationships. It will be understood that assignments may be otherwise activated and relationships otherwise determined and still remain within the scope of the present invention.

The identification table 64 may associate a user identifier with a personnel number for each member of the community. In one embodiment, the user identifier may be a user ID and/or a password received upon user logon. In this embodiment, the integrated application 32 may use the received user identifier to interrogate the identification table 64 to obtain a personnel number of the user. It will be understood that the identification table may comprise other information and still remain within the scope of the present invention. It will be further understood that the integrated application 32 may otherwise obtain the personnel number of a user and still remain within the scope of the present invention.

The organization assignment table 66 may associate personnel numbers with position identifiers for the members of the community. In one embodiment, the integrated application 32 may, during logon, use the personnel number obtained from identification table 64 to interrogate the organization assignment table 66 to obtain a position identifier of the user. In a particular embodiment, the position identifier may be an eight (8) digit number. It will be understood that the position identifier and organization assignment table 66 may comprise other information and still remain within the scope of the present invention. It will be further understood that the integrated application 32 may otherwise obtain the position identifier of the user and still remain within the scope of the present invention.

The profile assignment table 68 may comprise a relationship or evaluation path for each type of relationship defined in the community. Accordingly, in one embodiment, the profile assignment table 68 may comprise an evaluation path for administrative relationships, temporary work assignment relationships, substitute manager relationships and surrogate manager relationships. It will be understood that the profile assignment table 68 may include other evaluation paths and still remain within the scope of the present invention.

In one embodiment of the present invention, the profile assignment table 68 may be dynamic and include a dummy number as the start object of each evaluation path. In this embodiment, the integrated application 32 may replace the dummy number with the position identifier of a member whose relationships are sought to be determined and then evaluate the evaluation paths for the member. For the eight (8) digit embodiment of the position identifier, the dummy number may be eight (8) digits. Accordingly, separate profile assignments need not be maintained for each member of the community. Thus, the profile assignment table 68 need not be updated each time a member is added, deleted, reassigned or otherwise moved within the community.

As described in more detail below, the integrated application 32 may evaluate the evaluation paths from a manager to all related members (top-down) or from a member to a manager attempting to access records of the member (bottom-up). In the top-down embodiment, the integrated application 32 may use the position number of a manager as a start object to generate the list of authorized objects 36. As previously described, the list of authorized objects 36 may list all related members of the community within a manager's domain and the relationships between the manager and those members. The top-down embodiment may be preferred where a manager's domain is relatively small and/or the manager will perform a variety of functions for a number of members of his domain.

In the bottom-up embodiment, the integrated application 32 may use the member as the start object to evaluate the evaluation paths to determine if a relationship exists between the member and the manager attempting to access records of the member. The bottom-up embodiment may be preferred where the manager's domain is relatively large and it would take a long period of time to generate the list of authorized objects 36. It will be understood that integrated application 32 may otherwise evaluate the evaluation paths of the table 68 and still remain within the scope of the present invention.

The function table 70 may associate position identifiers with authorized function for members of the community. In one embodiment, the integrated application 32 may interrogate the function table 70 during user logon to generate the list of authorized functions 34. It will be understood that the function table 70 may comprise other information and still remain within the scope of the present invention. It will be further understood that the integrated application 32 may otherwise determine authorized functions 34 and still remain within the scope of the present invention.

The client systems 14 may be similar to the server system 12 and may be implemented using virtually any type of computer. Thus, the client systems 14 may each comprise a personal computer, file server, workstation, mini computer, mainframe, or any other computer capable of communicating and interacting with other computers.

The client systems 14 may each comprise an input/output system 80, processor 82 and memory 84. The input/output system 80 may connect the network 16 and other input and output devices to the client system 14. The network 16 may be directly connected to the client system 14 or may be connected through a data transmission device such as a modem or the like. Input devices may include a pointing device such as a mouse, a track pad, a keyboard or the like. Output devices may include a monitor, a printer or the like.

The client system 14 includes computer software that may be loaded into memory 84 and executed by the processor 82. The computer software may generally be identified by applications, modules and similar systems in memory 84. It will be understood that the computer software may be otherwise combined and/or divided for processing within the scope of the present invention. Accordingly, labels of the applications, modules and other software systems are for illustrative purposes and may be varied within the scope of the present invention.

Computer software may be loaded into memory 84 from disk storage (not shown). As previously described in connection with the server system 12, disk storage may include a variety of types of storage media such as floppy disk drives, hard disk drives, CD/ROM drives, or magnetic tape drives.

Memory 84 may include an operating system 86 and an interface application 88. In one embodiment, the operating system 86 may include a graphical user interface (GUI). In this embodiment, the operating system 86 may be MACINTOSH OS, WINDOWS NT, WINDOWS 95, OS/2 or any other type of graphical operating system. It will be understood that other types of operating systems, including non-graphical operating systems, may be used within the scope of the present invention.

The interface application 88 may connect to the server system 12 via the network 16 and access the integrated application 32. As previously described in connection with the server system 12, a user of the client system 14 may logon to the integrated application 32 by providing a user identifier. Upon logon, the user may utilize the integrated application 32 to view assignments of members and/or positions in a community, plan and/or submit new assignments and check the status of previously submitted assignments. The user may also utilize the integrated application 32 to access authorized records of members of the community reporting to the user.

The networks 16 and 22 may be any type of communication link capable of supporting data transfer. The networks 16 and 22 may be a local area network (LAN), a wide area network (WAN), combination network, or the like. It will be understood that the networks 16 and 22 may comprise other types of communication links within the scope of the present invention.

The methods of the present invention for structuring relationships of members of a community and of authorizing access to records of the members will now be described. The methods of the present invention relate to steps and/or operations for computer and processing electrical or other physical signals to generate desired physical signals and display results in interactions. These methods will generally be described in connection with a distributed system 10. It will be understood that the methods of the present invention may be performed in connection with other types of systems and still remain within the scope of the present invention.

Figure 2:
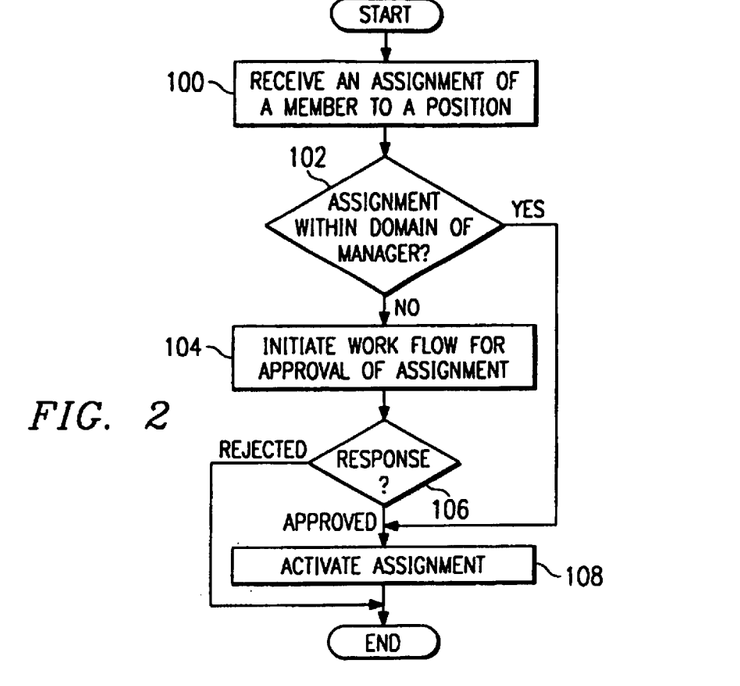
FIG. 2 is a flow diagram illustrating a method of initiating work flow for approval of an assignment of a member in accordance with one embodiment of the present invention.

FIG. 2 is a flow diagram illustrating a method of initiating work flow for approval of an assignment of a member of the community in accordance with one embodiment of the present invention. The method begins at step 100 where an assignment is received for a member to a position in the community. In one embodiment, the assignment may be received by the integrated application 32 upon submission of the assignment by a manager or other user within the community. As previously described, the assignment may be submitted via the assignment screens 40 and inboxes 42. It will be understood that the assignment may be otherwise submitted and/or received and still remain within the scope of the present invention.

Proceeding to decisional step 102, the integrated application 32 may determine if the assignment is within the domain of the manager or other user initiating the assignment. In one embodiment, the assignment may be within the domain of the manager, i.e., it is within one or more organizations managed by the manager. In this embodiment, the assignment is outside the manager's domain, because it is to or from an organization not managed by the manager. It will be understood that the domain of the manager may be otherwise defined and still remain within the scope of the present invention.

At decisional step 102, if the assignment is not within the domain of the manager, the NO branch leads to step 104. At step 104, the integrated application 32 may initiate work flow for approval of the assignment. In one embodiment, the work flow may be initiated by submitting a request to a work flow engine. In this embodiment, the work flow may proceed as described in related U.S. patent application Ser. No. 08/921,130, entitled "Method and System of Routing Requests for Authorized Approval," Attorney's Docket 42-97-002. It will be understood that the work flow may be otherwise initiated and/or processed within the scope of the present invention.

Next, at decisional step 106, the integrated application 32 may receive a response from the work flow process. If the assignment is approved, the approval branch of decisional step 106 may lead to step 108. At step 108, the integrated application 32 may activate the assignment. In one embodiment, the integrated application 32 may activate the assignment by storing the assignment in the database 54. In this embodiment, the relationship resulting from the assignment may be listed in the relationship table 62. Access privileges may thereafter be automatically granted based on the relationship when the relationship table 62 is interrogated by the integrated application 32. Thus, first and additional assignments of a member may be stored to generate first and second relationships and access privileges may be based on the relationship. It will be understood that the assignment may be otherwise activated and/or stored and that access privileges may be otherwise granted and still remain within the scope of the present invention.

If the assignment is rejected, the rejected branch of decisional step 106 may lead to the end of the process. Thus, the assignment is never activated. Accordingly, no access privileges are granted based on the rejected relationship. It will be understood that the integrated application 32 may receive other responses from the work flow process and still remain within the scope of the present invention.

Returning to decisional step 102, if the assignment is within the domain of the manager, then no approval may be required and the YES branch may lead to previously described step 108 wherein the assignment is activated. Step 108 leads to the end of the process. If the assignment is within the domain of the manager but nevertheless requires approval, the integrated application 32 may initiate work flow for approval as previously described in connection with step 104. Accordingly, assignments between organizations may be reviewed and approved by selected managers prior to being activated.

Figure 3:
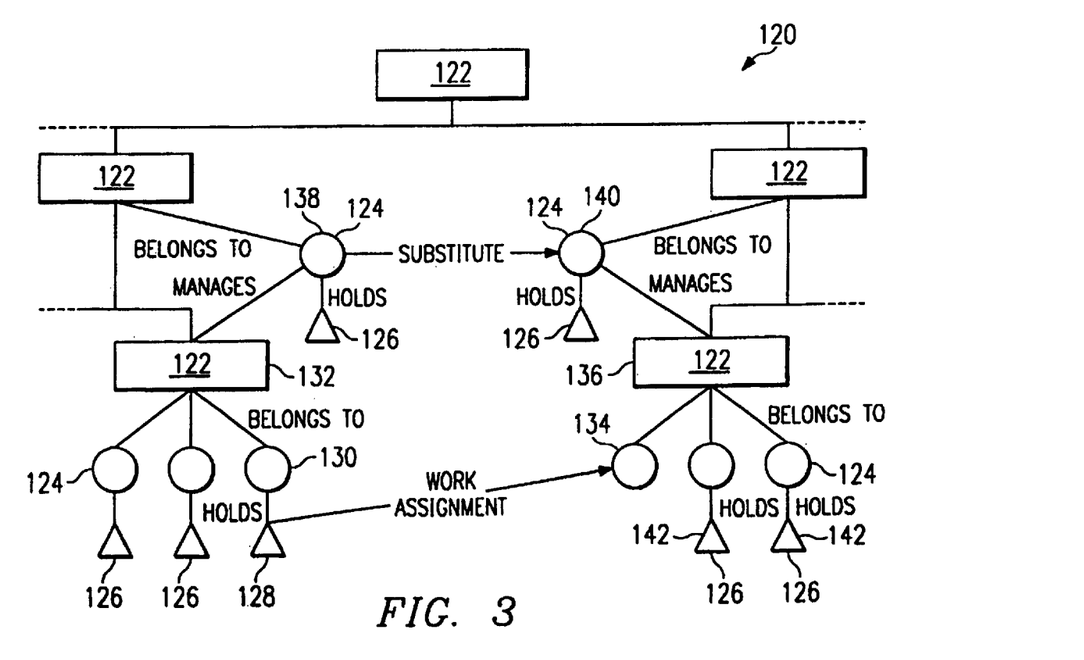
FIG. 3 is a schematic diagram illustrating relationships between members and positions of a community in accordance with one embodiment of the present invention.

FIG. 3 is a schematic diagram illustrating relationships between members and/or positions of a community 120 in accordance with one embodiment of the present invention. In this embodiment, the community 120 may comprise a business having organizations 122 with positions 124 to which employee members 126 are assigned. It will be understood that the community 120 may comprise other organizations, positions and/or members and that the organizations, positions and/or members may be otherwise assigned and still remain within the scope of the present invention.

In the community 120, exemplary member 128 may be administratively assigned to a position 130 of an organization 132 and be work assigned to an additional position 134 of another organization 136. Thus, the member 128 may report to manager position 138 of organization 132 and manager position 140 of organization 136. In this embodiment, manager position 138 may have administrative responsibility for the member 128. Manager position 140 may have only work assignment responsibility for the member 128. Accordingly, manager positions 138 and 140 may have disparate access privileges to records of the member 128 consistent with each manager's responsibilities toward the member 128.

In a particular embodiment, manager 138 in the administrative relationship with the member 128 may have full administrative access privileges to records of the member 128. Manager 140 in the work assignment relationship with the member 128 may have limited access privileges to records of the member 128. The limited access privileges may be a subset of the access privileges of the administrative manager 138. It will be understood that access privileges to records of the member 128 may be otherwise varied for administrative and/or work assignment managers and still remain within the scope of the present invention.

As also shown by FIG. 3, a position may be assigned to another position within the community 120. Thus, a first assignment of a first member of the community to a first manager position, a second assignment of a second member of the community to a second manager position and a third assignment of the first manager position to the second manager position may be stored. A benefit of such assignments is that they need not be updated when members holding those positions are replaced. Accordingly, time and resources necessary to manage the system 10 are reduced.

In accordance with this aspect of the present invention, exemplary manager position 138 may be assigned to the manager position 140. In one embodiment, the assignment may be as a substitute or surrogate manager. In this embodiment, substitute manager position 138 may be provided with full access privileges of the manager position 140 to records of members 142 reporting to the manager position 140. Surrogate manager position 138 may be provided with only limited access privileges of the manager position 140 to records of members 142 reporting to the manager position 140. Accordingly, access privileges may be varied for assignments between positions. It will be understood that positions may be otherwise assigned to other positions and/or access privileges otherwise varied and still remain within the scope of the present invention.

Figure 4:
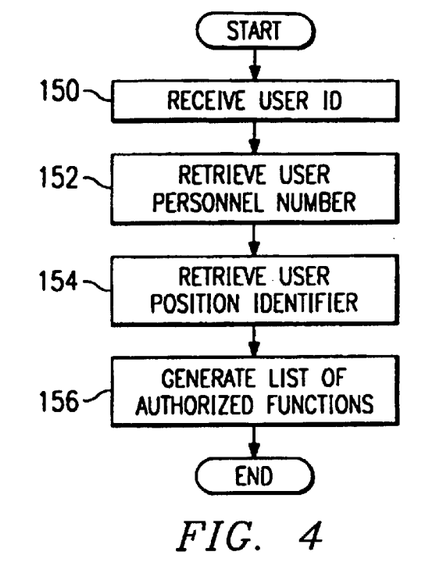
FIG. 4 is a flow diagram illustrating a method of generating a list of authorized functions in accordance with one embodiment of the present invention.

FIG. 4 is a flow diagram illustrating a method of generating the list of authorized functions 34 in accordance with one embodiment of the present invention. The method begins at step 150 wherein a user identifier is received. The user may be a manager or other member of the community. In one embodiment, the user identifier may be a user ID received by the integrated application 32 during logon of the user. It will be understood that the user identifier may be otherwise received within the scope of the present invention.

Proceeding to step 152, the integrated application 32 may retrieve a personnel number of the user. In one embodiment, the integrated application 32 may retrieve the personnel number by using the user identifier to interrogate the identification table 64. As previously described, the identification table 64 may associate user identifiers with personnel numbers for members of the community. It will be understood that the personnel number of the user may be otherwise retrieved and still remain within the scope of the present invention.

Next, at step 154, the integrated application 32 may retrieve a position identifier of the user. In one embodiment, the integrated application 32 may retrieve the position identifier of the user by using the personnel number retrieved from identification table 64 to interrogate the organization assignment table 66. As previously described, the organization assignment table 66 may associate personnel number with position identifiers for members of the community. It will be understood that the position identifier of the user may be otherwise received and still remain within the scope of the present invention.

Proceeding to step 156, the integrated application 32 may generate the list of authorized functions 34. In one embodiment, the integrated application 32 may generate the list of authorized functions 34 using the position identifier of the user obtained from the organization assignment table 66 to interrogate the function table 70. As previously described, the function table 70 may associate position identifiers with authorized functions for members of the community. It will be understood that authorized functions and/or the list of authorized functions 34 may be otherwise determined and still remain within the scope of the present invention. Step 156 leads to the end of the process.

Figure 5:
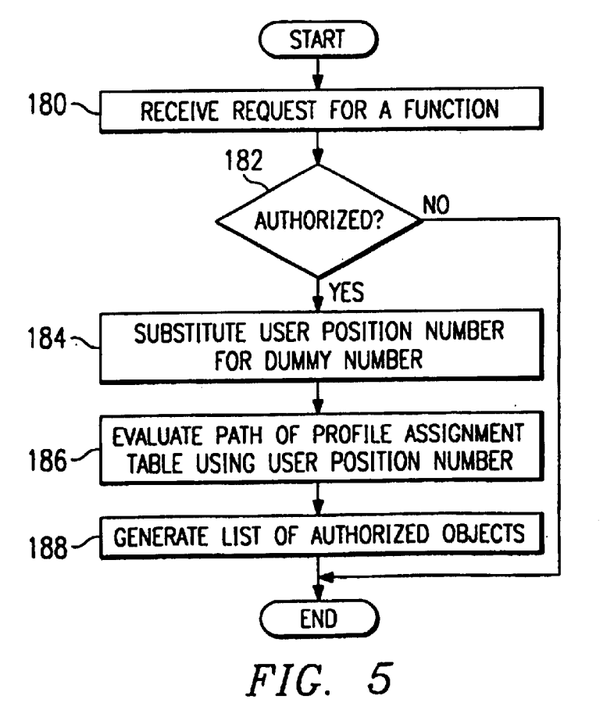
FIG. 5 is a flow diagram illustrating a method of generating a list of authorized objects in accordance with one embodiment of the present invention.

FIG. 5 is a flow diagram illustrating a method of generating a list of authorized objects in accordance with one embodiment of the present invention. The method begins at step 180 wherein a request for a function may be received. In one embodiment, the request may be received by the integrated application 32 as the result of a selection from the list of authorized functions 34. It will be understood that the function request may be otherwise received and still remain within the scope of the present invention.

Proceeding to decisional step 182, the integrated application 32 may determine if the function is authorized for the user. In one embodiment, the integrated application 32 may determine if the function is authorized by determining if the function is included in the list of authorized functions 34. In another embodiment, where the function is selected from the list of authorized functions 34, step 182 may be skipped. It will be understood that the integrated application 32 may otherwise determine if the function is authorized and still remain within the scope of the present invention. For example, whether a function is allowed for a user may be determined without generation of the list of authorized functions 34.

At decisional step 182, if the function is not authorized, the NO branch of decisional step 182 leads to the end of the process. In this case, the user may restart the process by selecting another function which may be received as previously described at step 180. It will be understood that other steps may be taken in response to receipt of an unauthorized function and still remain within the scope of the present invention.

If the function is authorized at decisional step 182, the YES branch leads to step 184. At step 184, the integrated application 32 may substitute the user's position number for the dummy number in memory read from the profile assignment table 68. The position identifier may be obtained as previously described in connection with the flow diagram of FIG. 4. It will be understood that the position identifier and/or other identifier of the user may be otherwise obtained and still remain within the scope of the present invention.

As previously described, the profile assignment may be dynamic to facilitate this, the profile assignment table 68 may use a dummy number as a start object of an evaluation path. In this embodiment, the integrated application 32 may substitute the dummy number with the position identifier of the user. Accordingly, separate evaluation paths need not be maintained for each member of the community. Thus, the profile assignment table 68 need not be updated each time a member is added, deleted, resigned, or otherwise moved within the community.

Next, at step 186, the integrated application 32 may evaluate the evaluation paths of the profile assignment table 68 using the position identifier of the user as a start object. As previously described, the profile assignment table 68 may include evaluation paths for each type of relationship allowed in the community. In one embodiment, the profile assignment table 68 may include evaluation paths for administrative relationships, temporary work assignment relationships, substitute manager relationships and surrogate manager relationships or a combination thereof. It will be understood that the profile assignment table 68 may include other evaluation paths and still remain within the scope of the present invention.

For each evaluation path, the integrated application 32 may determine all organizations of the community associated with the position of the user, all positions belonging to those organizations and all members holding, work assigned or otherwise associated with the positions belonging to the organizations. It will be understood that the evaluation paths may be otherwise evaluated and still remain within the scope of the present invention.

Proceeding to step 188, the integrated application 32 may generate a relationship record. The relationship record may be the list of authorized objects 36. The authorized objects may be all objects found in evaluating the evaluation paths for the user. The objects found in evaluating the evaluation paths may include all objects in the user's domain and relationships of those objects to the user. As described in more detail below, the list of authorized objects 36 may be used by the integrated application 32 to authorize access to records of a member. Step 188 leads to the end of the process.

Figure 6:
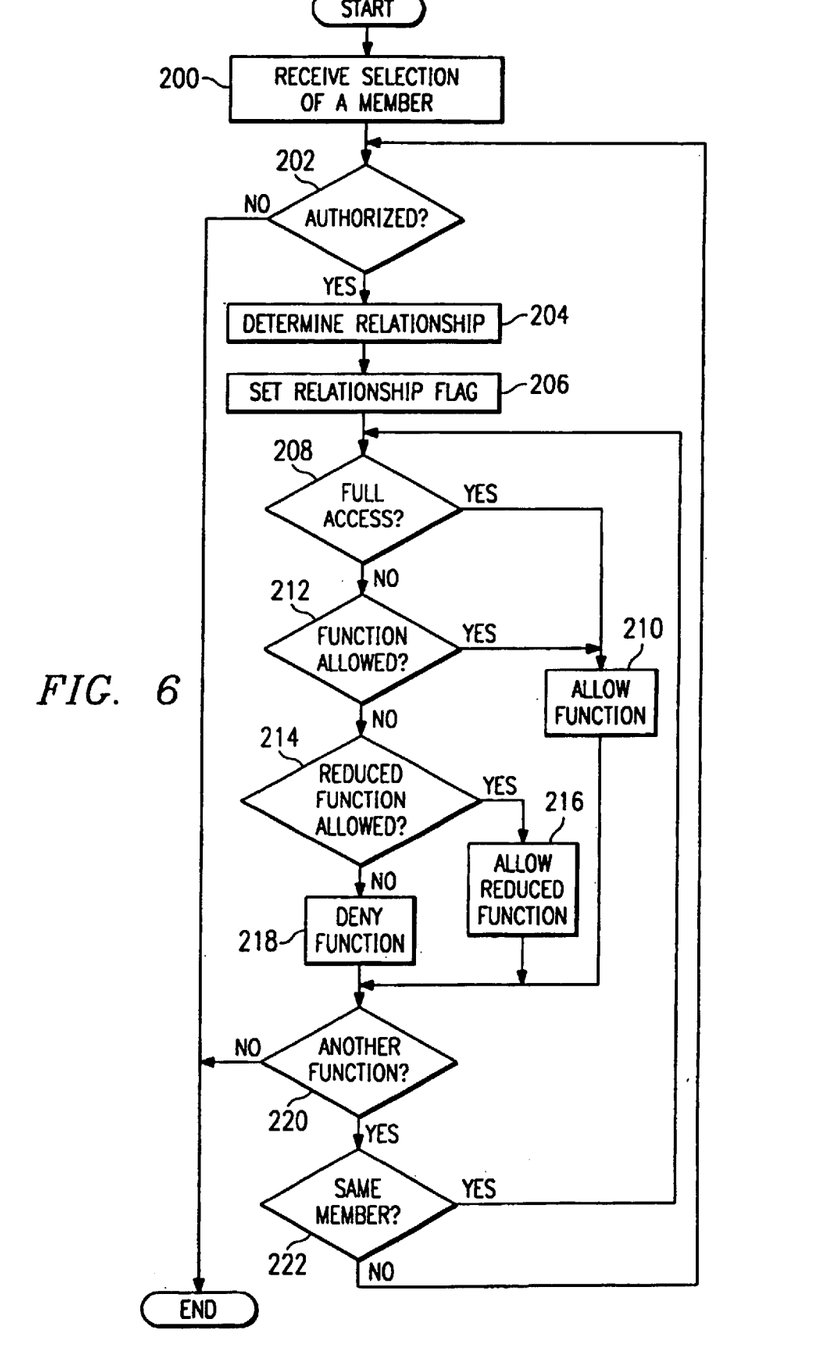
FIG. 6 is a flow diagram illustrating a method of authorizing access to records of members of a community in accordance with one embodiment of the present invention.

FIG. 6 is a flow diagram illustrating a method of authorizing access to records of members of the community in accordance with a top-down embodiment of the present invention. The method begins at step 200 wherein a selection of a member of the community for access to records of the member is received. The selection may be received by the integrated application 32 from the user. In one embodiment, the member may be selected by personnel number. It will be understood that the member may be otherwise selected and/or identified and still remain within the scope of the present invention.

Proceeding to decisional step 202, the integrated application 32 may determine if the user is authorized to access records of the selected member. In one embodiment, the user may be authorized access to records of the member if the member is on the list of authorized objects 36 generated by the integrated application 32. Thus, in this embodiment, the user is authorized access to at least some records of the member where the member is within the domain of the user. The user is not authorized access to records of the member if the member is not on the list of authorized objects 36. It will be understood that it may be otherwise determined if the user is authorized access to records of the member and still remain within the scope of the present invention.

At decisional step 202, if the user is not authorized access to records of the member, the NO branch leads to the end of the process. In this case, the user may select another member and again begin the process. It will be understood that other steps may be performed in response to selection of an authorized member and still remain within the scope of the present invention.

If at decisional step 202 the user is authorized access to records of the member, the YES branch leads to step 204. At step 204, the integrated application 32 may determine the relationship between the user and the selected member. In one embodiment, the relationship may be determined from the list of authorized objects 36. As previously described, the list of authorized objects 36 may include all objects in the user's domain and relationships of those objects to the user.

Next, at step 206, the integrated application 32 may set a flag identifying the relationship between the user and the selected member. As described in more detail below, the flag may be used in granting access privileges to the user. It will be understood that the relationship between the user and the selected member may be otherwise determined and/or otherwise identified and still remain within the scope of the present invention.

Proceeding to decisional step 208, the integrated application 32 may determine if the user is allowed full access privileges to records of the member. In one embodiment, full access privileges may be allowed where the member is administratively assigned to a position within the user's domain. In this embodiment, the member may be in the user's domain when administratively assigned to a position within an organization managed or substitute managed by the user. It will be understood that full access privileges to records of the member may be provided in other relationships and still remain within the scope of the present invention. It will be further understood that disparate access privileges may be provided in administrative relationships and still remain within the scope of the present invention. Thus, an administrative manager may have limited access to records of a member.

At decisional step 208, if the user is allowed full access privileges to records of the member, the YES branch leads to step 210 where the requested access is allowed for the selected member. As previously described, the requested access may be a previously selected function, such as at step 180. Thus, in this embodiment, full access privileges allow the user to carry out all functions authorized by the profile regarding records of the member. If full access privileges are not allowed for the relationship between the user and the selected member, the NO branch of decisional step 208 leads to decisional step 212.

At decisional step 212, the integrated application 32 may determine if the function is allowed for the relationship between the user and the selected member. In one embodiment, the integrated application 32 may determine if the function is allowed for the relationship by interrogating the relationship flag set at step 206 and the user exits 44 based on that flag.

At decisional step 212, if the function is allowed for the relationship between the user and the selected member, the YES branch leads also to step 210 where the selected function is allowed for the selected member. If the selected function is not allowed for the selected member, the NO branch of decisional step 212 leads to decisional step 214.

At decisional step 214, the integrated application 32 may determine if reduced access is instead allowed for the selected member. For example, read-only access may be provided for a record to which read and write access was requested. For a selected function, the reduced access may be a reduced function. In one embodiment, the integrated application 32 may determine if a reduced function is allowed by interrogating the user exits 44 based on the relationship flag. If a reduced function is allowed for the selected member, the YES branch of decisional step 214 may lead to step 216 where the reduced function is allowed. If no reduced function is allowed for the relationship between the user and the selected member, the NO branch of decisional step 214 leads to step 218 where the selected function is denied for the selected member. It will be understood that it may be otherwise determined if the function is allowed for the relationship between the user and the selected member and still remain within the scope of the present invention.

Step 218 leads to decisional step 220. Steps 210 and 216 also lead to decisional step 220. At decisional step 220, the integrated application 32 may determine if another function is requested by the user. In one embodiment, another function may be requested by the user when received by the integrated application 32 as previously described in connection with the flow diagram of FIG. 5. It will be understood that it may be otherwise determined if another function is requested and still remain within the scope of the present invention.

If another function is not requested by the user, the NO branch of decisional step 220 may lead to the end of the process. If another function is requested by the user, the YES branch of decisional step 220 may lead to decisional step 222.

At decisional step 222, the integrated application 32 may determine if the requested function is for the same member that was previously selected. In one embodiment, the requested function may be for a different member if a selection of a different member is received by the integrated application 32 as previously described in connection with step 200. It will be understood that selection of a different member may be otherwise received and remain within the scope of the present invention.

If the selected function is for the same member, the YES branch of decisional step 222 may return to decisional step 208 where the integrated application 32 may determine if the user has full access privileges to records of the member based on the relationship determined and the flags set for that member previously at steps 204 and 206. If the requested function is for another member, the NO branch of decisional step 222 may return to decisional step 202 where it is determined if the user is authorized to access records of the newly-selected member. Thus, a manager's access to records of a member may be authorized by determining all members within the manager's domain and the type of relationship between the manager and those members. Based on the information, it may be determined if requested access to records of a member is authorized for the relationship between the user and the member. Accordingly, managers are provided with only needed access privileges to records of members reporting to the managers.

Figure 7:
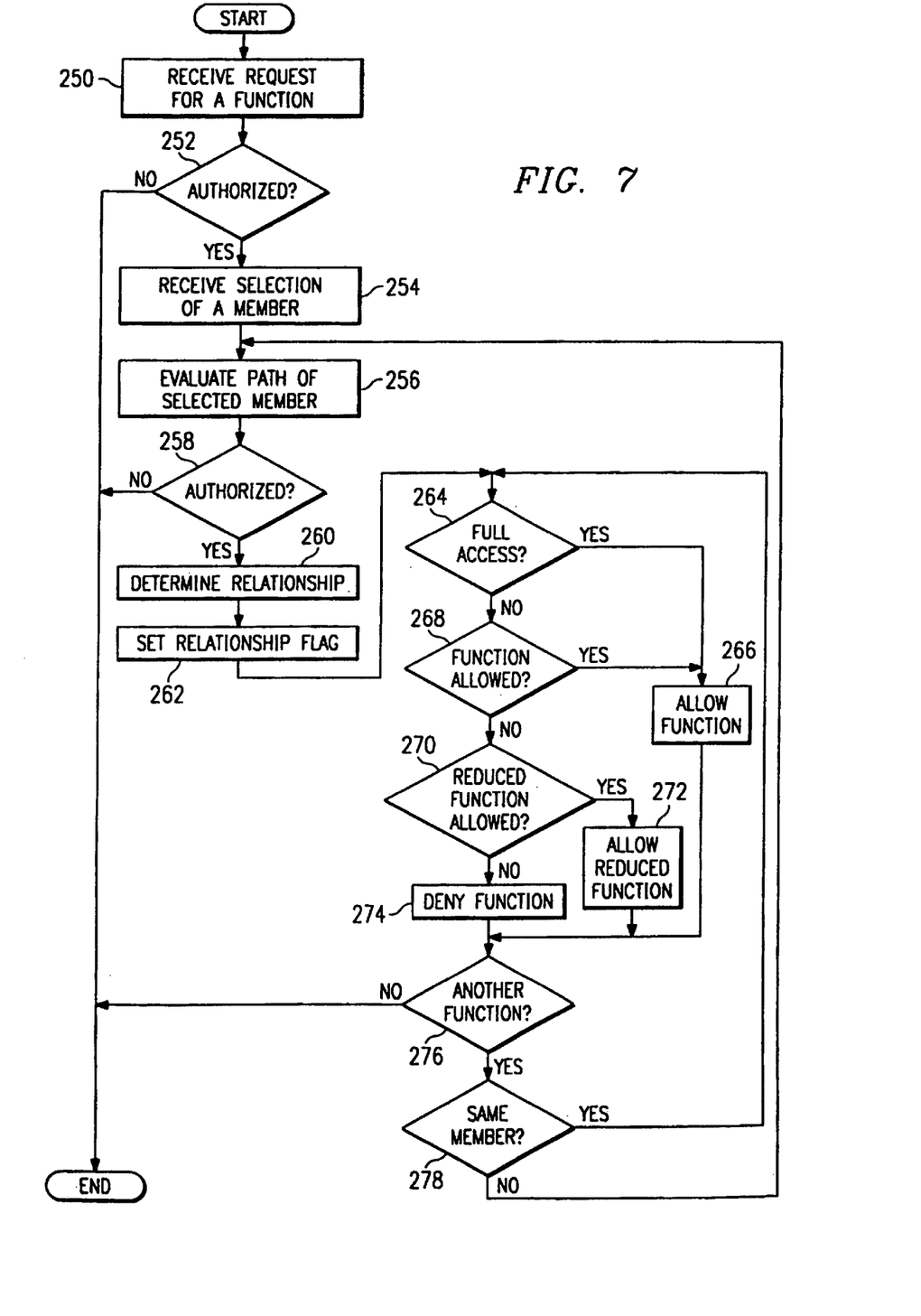
FIG. 7 is a flow diagram illustrating a method of authorizing access to records of members of a community in accordance with another embodiment of the present invention.

FIG. 7 is a flow diagram illustrating a method of authorizing access to records of members of a community in accordance with a bottom-up embodiment of the present invention. The method begins at step 250 wherein a request for a function may be received. As previously described in connection with the flow diagram of FIG. 5, the request may be received by the integrated application 32 as the result of a selection from the list of authorized functions 34. It will be understood that the request for a function may be otherwise received and still remain within the scope of the present invention.

Proceeding to decisional step 252, the integrated application 32 may determine if the function is authorized for the user. In one embodiment, the integrated application 32 may determine if the function is authorized by determining if the function is included in the list of authorized functions 34. In another embodiment, where the function is selected from the list of authorized functions 34, step 252 may be skipped. It will be understood that the integrated application 32 may otherwise determine if the function is authorized and still remain within the scope of the present invention. For example, whether a function is allowed for a user may be determined without generation of the list of authorized functions 34.

At step 252, if the function is not authorized for the user, the NO branch of decisional step 252 leads to the end of the process. In this case, the user may select another function and again begin the process. It will be understood that other steps may be performed in response to selection of an unauthorized function and still remain within the scope of the present invention.

If the function is authorized for the user, the YES branch of decisional step 252 leads to step 254. At step 254, a selection of a member for access to records of the member may be received. The selection may be received by the integrated application 32 from the user. In one embodiment, the member may be selected by personnel number. It will be understood that the member may be otherwise selected and/or identified and still remain within the scope of the present invention.

Next, at step 256, the integrated application 32 may evaluate the evaluation paths of the profile assignment table 68 for the selected member. As previously described, the profile assignment table 68 may include evaluation paths for each type of relationship allowed in the community. For each evaluation path, the integrated application 32 may determine the positions, organizations, and managers associated with the selected member.

In one embodiment, the integrated application 32 may use the personnel number of the selected member as a start object in the profile assignment table 68. It will be understood that the evaluation paths for the selected member may be otherwise evaluated within the scope of the present invention. For example, the personnel number of the selected member may be used to retrieve a position identifier of the member. In this embodiment, the position identifier may be used as a start object in the profile assignment table 68.

Proceeding to decisional step 258, the integrated application 32 may determine if the user is authorized to access records of the selected member. In one embodiment, the user may be authorized to access records of the member if the evaluation paths determined a relationship existed between the user and the member. A relationship may exist between the user and the member to establish access privileges when the assignment establishing the relationship is active or in another status and listed in the relationship table 62. It will be understood that it may be otherwise determined whether the user is authorized access privileges to records of the member and remain within the scope of the present invention.

At decisional step 258, if the user is not authorized access to records of the selected member, the NO branch leads to the end of the process. In this case, the user may select another member and again begin the process. It will be understood that other steps may be performed in response to selection of an unauthorized member and still remain within the scope of the present invention.

If the user is authorized access to records of the member, the YES branch of decisional step 258 leads to step 260. At step 260, the integrated application 32 may determine the relationship between the user and the selected member. In one embodiment, the relationship may be determined from the relationship table 62. As previously described, the relationship table 62 may list all relationships in the community. It will be understood that the relationship between the user and the selected member may be otherwise determined within the scope of the present invention.

Next, at step 262, the integrated application 32 may set a flag identifying the relationship between the user and the selected member. As described in more detail below, the flag may be used in granting access privileges to the user. It will be understood that the relationship between the user and the selected member may be otherwise identified and still remain within the scope of the present invention.

Proceeding to decisional step 264, the integrated application 32 may determine if a user is allowed full access privileges to records of the member. In one embodiment, full access privileges may be allowed where the member is administratively assigned to a position within the user's domain. In this embodiment, the member may be in the user's domain where administratively assigned to a position within an organization managed or substitute managed by the user. It will be understood that full access privileges to records of the member may be provided in other relationships and that other access privileges may be provided in administrative relationships and still remain within the scope of the present invention.

At decisional step 264, if the user is allowed full access privileges to records of the member, the YES branch leads to step 266 where the requested access is allowed for the selected member. The requested access may be the previously selected function. Thus, in this embodiment, full access privileges allow the user to carry out all functions regarding records of the member. If full access privileges is not allowed for the relationship between the user and the selected member, the NO branch of decisional step 264 leads to decisional step 268. At decisional step 268, the integrated application 32 may determine if the function is allowed for the relationship between the user and the selected member. In one embodiment, the integrated application 32 may determine if the function is allowed for the relationship by interrogating the relationship flag set at step 262 and the user exits 44 based on that flag.

At decisional step 268, if the function is allowed for the relationship between the user and the selected member, the YES branch leads also to step 266 where the selected function is allowed for the selected member. If the selected function is not allowed for the selected member, the NO branch of decisional step 268 leads to decisional step 270.

At decisional step 270, the integrated application 32 may determine if reduced access is instead allowed for the selected member in order to accommodate the member. For the selected function, the reduced access may be a reduced function. In one embodiment, the integrated application 32 may determine if a reduced function is allowed by interrogating the user exits 44 based on the relationship flag. If reduced function is allowed for the selected member, the YES branch of decisional step 270 may lead to step 272 where the reduced function is allowed. If no reduced function is allowed for the relationship between the user and the selected member, the NO branch of decisional step 270 leads to step 274 where the selected function is denied for the selected member. It will be understood that it may be otherwise determined if the function is allowed for a relationship and still remain within the scope of the present invention.

Step 274 leads to decisional step 276. Steps 266 and 272 also lead to decisional step 276. At decisional step 276, the integrated application 32 may determine if another function is requested by the user. In one embodiment, another function may be requested by the user when received by the integrated application 32 as previously described in connection with step 250. It will be understood that it may be otherwise determined if another function is requested by the user.

If another function is not requested by the user, the NO branch of decisional step 276 may lead to the end of the process. If another function is requested by the user, the YES branch of decisional step 276 may lead to decisional step 278.

At decisional step 278, the integrated application 32 may determine if the requested function is for the same member that was previously selected. In one embodiment, the requested function may be for a different member if a selection of a different member is received by the integrated application 32 as previously described in connection with step 254. It will be understood that it may be otherwise determined if the requested function is for the same member and still remain within the scope of the present invention.

If the selected function is for the same member, the YES branch of decisional step 278 may return to decisional step 264 where the integrated application 32 may determine if the user has full access privileges to records of the member based on the relationship determined and the flag set for that member previously at steps 260 and 262. If the requested function is for another member, the NO branch of decisional step 278 may return to step 256 where the integrated application 32 may evaluate the profile assignment paths of the profile assignment table 68 for the newly selected member. Thus, a manager's access to records of a member may be authorized by determining the type of relationship, if any, between the manager and the selected member and if the requested access to records of the member is authorized for that relationship. Accordingly, managers are provided with only needed access privileges to records of members reporting to the managers.

Figure 8:
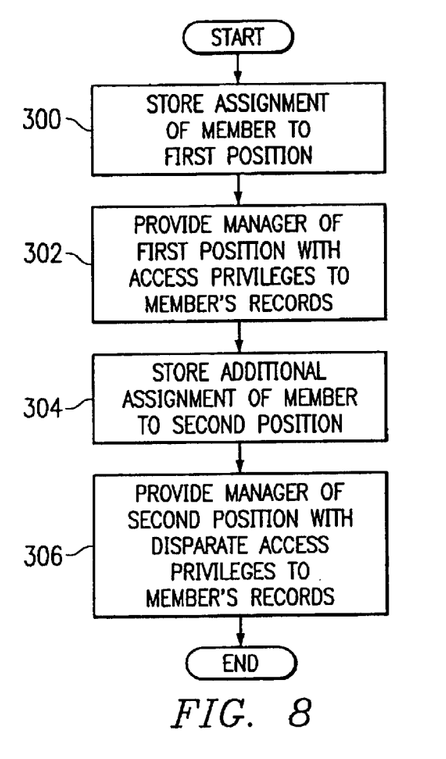
FIG. 8 is a flow diagram illustrating a method of authorizing access to records of members of a community in accordance with one embodiment of the present invention.

FIG. 8 is a flow diagram illustrating a method of authorizing access to records of members of a community in accordance with one embodiment of the present invention. System 10 stores an assignment of a member of a community to a first position in the community at step 300. This produces a first relationship in system 10. System 10 automatically provides a manager of the first position with access privileges to records of the member at step 302. System 10 may provide the access privileges to the manager based on the first relationship. The records may, for example, comprise personnel records of the member, where the community is a business and the member is an employee.

System 10 stores an additional assignment of the member to a second position in the community at step 304. This produces a second relationship in system 10. The additional work assignment may, for example, comprises a temporary work assignment. During the pendency of the additional assignment, system 10 automatically provides a manager of the second position with disparate access privileges to records of the member at step 306. System 10 may provide the access privileges to the manager of the second position based on the second relationship. This may allow, for example, the manager of the second position to receive limited access privileges to records of the member. This may also allow giving the manager of the first position access privileges to administrative records of the member, and denying the manager of the second position access privileges to the administrative records.

Figure 9:
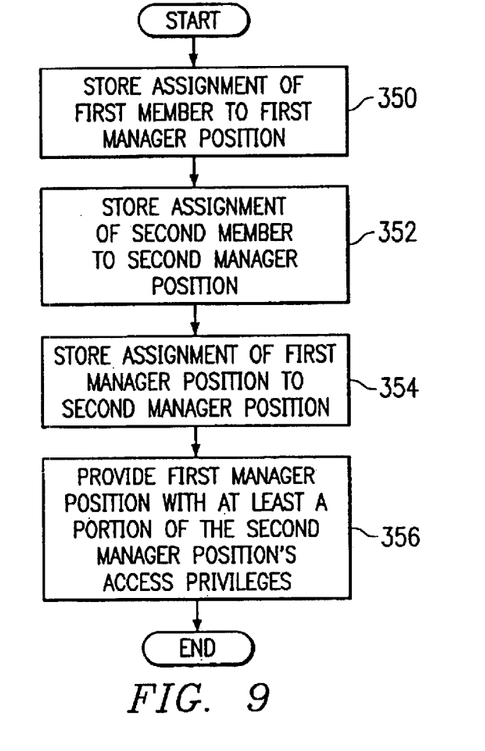
FIG. 9 is a flow diagram illustrating another method of authorizing access to records of members of a community in accordance with one embodiment of the present invention.

FIG. 9 is a flow diagram illustrating another method of authorizing access to records of members of a community in accordance with one embodiment of the present invention. System 10 stores a first assignment of a first member of a community to a first manager position at step 350. System 10 stores a second assignment of a second member of the community to a second manager position in the community at step 352. The first and second member may, for example, be employees of a business. System 10 stores a third assignment of the first manager position to the second manager position at step 354. The first manager position may be assigned to the second manager position in a substitute, surrogate or other relationship.

System 10 automatically provides the first manager position with at least a portion of the access privileges of the second manager position to records of member of the community reporting the second manager position at step 356. The records may, for example, comprise personnel records of employees reporting to the second manager. In one embodiment, system 10 may provide the first manager position with full access privileges to records of members of the community reporting to the second manager position. In another embodiment, the access privileges provided to the first manager position by system 10 exclude access to administrative records of members of the community reporting to the second manager position.

Although the present invention has been described with several embodiments, various changes, modifications, equivalents and requirements may be suggested to one skilled in the art. It is intended that the present invention encompass those changes, modifications and equivalents as fall in the scope of appended claims.

What is claimed is:

1. A method of providing access privileges to records of members of a community, comprising:
   storing an assignment of a member of a community to a first position in the community to generate a first relationship;
   automatically providing a manager of the first position with access privileges to records of the member based on the first relationship;
   storing an additional assignment of the member to a second position in the community to generate a second relationship; and
   during pendency of the additional assignment, automatically providing a manager of the second position with disparate access privileges to records of the member based on the second relationship.

2. The method of claim 1, wherein the manager of the second position has limited access privileges to records of the member.

3. The method of claim 1, wherein the manager of the first position has access privileges to administrative records of the member denied to the manager of the second position.

4. The method of claim 1, wherein the additional assignment comprises a temporary work assignment.

5. The method of claim 1, wherein the community comprises a business and the member comprises an employee of the business.

6. The method of claim 1, wherein the records comprise personnel records of the member.

7. A method of providing access privileges to records of members of a community, comprising:
   storing a first assignment of a first member of a community to a first manager position in the community;
   storing a second assignment of a second member of the community to a second manager position in the community;
   storing a third assignment of the first manager position to the second manager position to generate a relationship; and
   automatically providing the first member with at least a portion of the access privileges of the second member based on the relationship, the access privileges of the second member comprising access privileges to records of members of the community reporting to the secod manager position.

8. The method of claim 7, further comprising automatically providing the first manager position with full access privileges of the second manager position to records of members of the community reporting to the second manager position.

9. The method of claim 7, wherein the access privileges provided to the first manager position exclude access privileges of the second manager position to administrative records of members of the community reporting to the second manager position.

10. The method of claim 7, wherein the community comprises a business and the first and second members comprise employees of the business.

11. The method of claim 7, wherein the records comprise personnel records of the member.

12. A system for providing access privileges to records of members within a community, comprising:
   a memory operable to store:
      a plurality of allowed types of assignments of members of a community to positions in the community; and
      a record of assignments of members of the community to positions in the community; and
   a processor operable to automatically provide a first member and second member with disparate access privileges to records of third member based on at least two of the recorded assignments in the memory, at least two of the recorded assignments involving different allowed types of assignments.

13. The system of claim 12, wherein the allowed assignments include assignments between positions in the community.

14. The system of claim 12, wherein a temporary assignment of a member to a position is associated with limited access privileges to records of the member.

15. A system for providing access privileges to records of members of a community, comprising:
   a memory operable to store:
      an assignment of a member of a community to a first position in the community to generate a first relationship; and
      an additional assignment of the member to a second position in the community to generate a second relationship; and
   a processor operable to:
      automatically providing a manager of the first position with access privileges to records of the member based on the first relationship; and
      during pendency of the additional assignment, automatically providing a manager of the second position with disparate access privileges to records of the member based on the second relationship.

16. A system for providing access privileges to records of members of a community, comprising:
   at least one computer readable medium; and
   software encoded on the at least one computer readable medium and operable when executed by a processor to:
      store an assignment of a member of a community to a first position in the community to generate a first relationship;
      store an additional assignment of the member to a second position in the community to generate a second relationship; and
      automatically provide a manager of the first position with access privileges to records of the member based on the first relationship; and
      during pendency of the additional assignment, automatically provide a manager of the second position with access privileges to records of the member based on the second relationship.

17. A system for providing access privileges to records of members of a community, comprising:
   a memory operable to store:
      a first assignment of a first member of a community to a first manager position in the community;
      a second assignment of a second member of the community to a second manager position in the community; and
      a third assignment of the first manager position to the second manager position to generate a relationship; and
   a processor operable to automatically provide the first member with at least a portion of the access privileges of the second member based on the relationship stored in the memory, the access privileges of the second manager comprising access privileges to records of members of the community reporting to the second manager position.

18. A system for providing access privileges to records of members of a community, comprising:
   at least one computer readable medium; and
   software encoded on the at least one computer readable medium and operable when executed by a processor to:
      store a first assignment of a first member of a community to a first manager position in the community;
      store a second assignment of a second member of the community to a second manager position in the community;
      store a third assignment of the first manager position to the second manager position to generate a relationship; and
      automatically provide the first member with at least a portion of the access privileges of the second member based on the relationship, the access privileges of the second manager comprising access privileges to records of members of the community reporting to the second manager position.

19. A method of providing access privileges to records of members of a community, comprising:
   storing an assignment of a particular member of a community to a first position in the community to generate a first relationship;
   generating a list of at least one authorized fUnction associated with a manager of the first position;
   generating a list of at least one authorized object associated with the manager of the first position, the at least one authorized object representing at least one member of the community related to the manager of the first position such that the manager of the first position may access records associated with the at least one member;
   providing the manager of the first position with access privileges to records of the particular member based at least partially on the at least one authorized fUnction and the at least one authorized object;
   storing an additional assignment of the particular member to a second position in the community to generate a second relationship; and
   during pendency of the additional assignment, automatically providing a manager of the second position with disparate access privileges to records of the particular member based on the second relationship.

20. A method of providing access privileges to records of members of a community, comprising:
   storing a first assignment of a first member of a community to a first manager position in the community;

storing a second assignment of a second member of the community to a second manager position in the community;

storing a third assignment of the first manager position to the second manager position to generate a relationship; and generating a list of at least one authorized function associated with the second member;

generating a list of at least one authorized object associated with the second member, the at least one authorized object representing at least one member of the community related to the second member such that the second member may access records associated with the at least one member; and providing the first member with at least a portion of the access privileges of the second member based at least partially on the at least one authorized function and the at least one authorized object, the access privileges of the second member comprising access privileges to records of members of the community reporting to the second manager position.

* * * * *